United States Patent
Klein

(10) Patent No.: US 7,464,723 B2
(45) Date of Patent: Dec. 16, 2008

(54) NON-RETURN VALVE

(75) Inventor: Volkmar Klein, Zweibrücken (DE)

(73) Assignee: Hydac Filtertechnik GmbH, Sulzbach/Saar (DE)

(*) Notice: Subject to any disclaimer, the term of this patent is extended or adjusted under 35 U.S.C. 154(b) by 86 days.

(21) Appl. No.: 10/591,041

(22) PCT Filed: Feb. 4, 2005

(86) PCT No.: PCT/EP2005/001124

§ 371 (c)(1),
(2), (4) Date: Aug. 29, 2006

(87) PCT Pub. No.: WO2005/098284

PCT Pub. Date: Oct. 20, 2005

(65) Prior Publication Data

US 2007/0181190 A1 Aug. 9, 2007

(30) Foreign Application Priority Data

Mar. 17, 2004 (DE) .................. 10 2004 014 377

(51) Int. Cl.
*F16K 21/04* (2006.01)
*F16K 15/00* (2006.01)
*F16K 17/00* (2006.01)

(52) U.S. Cl. .................. 137/543.15; 251/359; 251/360; 137/524

(58) Field of Classification Search ............ 137/543.13, 137/524, 540; 251/285, 337, 359, 360
See application file for complete search history.

(56) References Cited

U.S. PATENT DOCUMENTS

| 1,150,641 | A |   | 8/1915 | Smith |         |
|-----------|---|---|--------|-------|---------|
| 1,800,185 | A | * | 4/1931 | Thrush | 137/543.17 |
| 2,699,179 | A |   | 1/1955 | Hansen et al. | |
| 2,880,750 | A | * | 4/1959 | Amison, Jr. | 137/469 |
| 2,884,952 | A | * | 5/1959 | Mason et al. | 137/494 |
| 3,255,774 | A |   | 6/1966 | Gallagher | |
| 3,756,273 | A | * | 9/1973 | Hengesbach | 137/540 |
| 4,279,746 | A | * | 7/1981 | Leutz | 210/130 |
| 5,332,000 | A |   | 7/1994 | Gassner | |
| 6,615,774 | B2 | * | 9/2003 | Heulitt | 123/73 V |
| 6,997,208 | B2 | * | 2/2006 | Mack | 137/549 |

FOREIGN PATENT DOCUMENTS

| DE | 26 57 669 | 6/1978 |
| EP | 0 819 875 | 1/1998 |
| GB | 1 011 376 | 11/1965 |
| JP | 06 058431 | 3/1994 |

* cited by examiner

*Primary Examiner*—John Rivell
*Assistant Examiner*—Atif H Chaudry
(74) *Attorney, Agent, or Firm*—Roylance, Abrams, Berdo & Goodman, L.L.P.

(57) ABSTRACT

A non-return valve includes a valve body (1) which defines an internal fluid through-opening (7) extending along the longitudinal axis (5) of the body. A seat body (17) defines a valve seat (31) arranged in the through opening (7). A closing body (35) is axially displaceable in the through opening (7) oppositely to a closing force produced by a closing spring (45) between a closed position applied to the seat body (17) and an open position lifted from the valve seat (31) on the closing body (35). The valve body (1) forms a guide along which the seat body (17) is axially displaceable in different adjusting positions corresponding to the desired preloads of the closing spring (45) and, consequently to the desired adjustments of the closing force quantity of the closing spring (45).

12 Claims, 1 Drawing Sheet

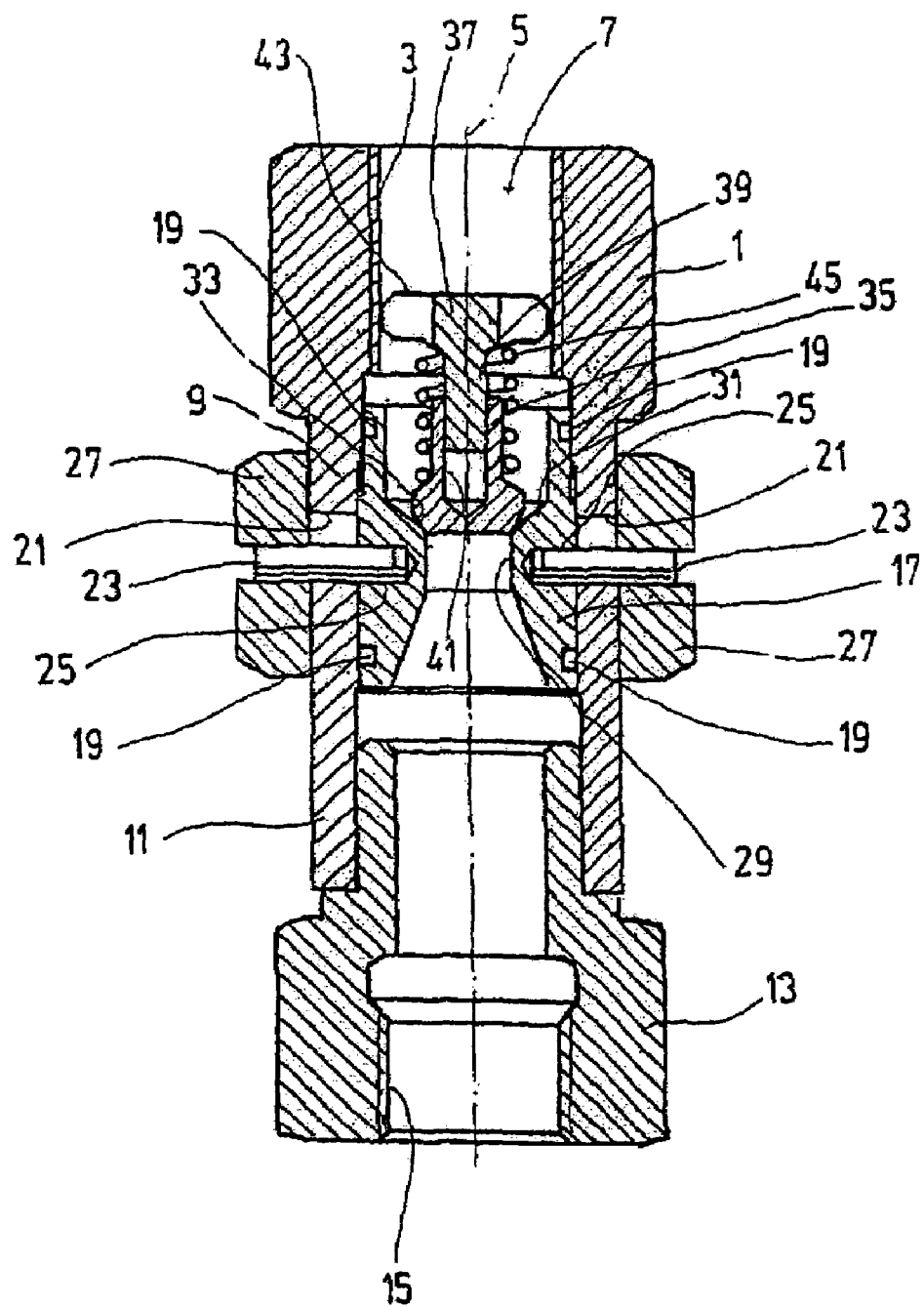

NON-RETURN VALVE

SUMMARY OF THE INVENTION

The present invention relates to a non-return valve having a valve housing defining an interior fluid passage extending along the longitudinal axis of the passage, a seat element positioned in the passage and defining a valve seat, and a detent element moveable axially against the closing force of a closing spring in the passage between a detent position adjoining the seat element and opening positions raised above the valve seat on the detent element.

BACKGROUND OF THE INVENTION

Fluid-engineering assemblies frequently contain non-return valves as components of the control systems of the assemblies. In many practical applications, controls using non-return valves with fixed opening pressures, are not trouble-free because of the variable configuration of the assemblies (with regard to pressure level, volume flow, site of installation, and the like). In such case, the non-return valve must be replaced with a valve set for the opening pressure adapted to the assembly when the assembly is placed in operation on site. This replacement entails burdensome and time-consuming conversion measures. In some instances, it must be executed repeatedly because the opening pressure required in individual cases cannot be accurately foreseen. A remedy can be in the form of a non-return valve that could be adjusted as a function of the opening pressure.

Currently available adjustable non-return valves cannot, however, meet the requirements to be set. Conventional valves with adjustable opening pressure are configured as pressure control valves. Aside from the fact that pressure control valves are not well suited for the purpose with respect to adjustment ranges, pressure stages, and temperature ranges, the chief problem encountered with pressure-control valves is that the flow of fluid is diverted at an angle of 90° downstream from the adjustment device. Fouling particles may then be deposited on the valve seat for fouling-laden fluids and may then cause the valve to fail.

SUMMARY OF THE INVENTION

An object of the present invention is to provide an adjustable non-return valve which, like the conventional non-return valves, operates with no deflection of the flow of fluid (input/output and direction of action of the valve on one longitudinal axis), wherein the opening pressure may be adjusted without modifying the structural length of the valve.

According to the present invention, this object is basically attained by a non-return valve having a valve housing is in the form of a guide along which a seat element may be displaced axially into various adjustment positions corresponding to the desired prestresses of the closing spring, and accordingly, the desired adjustments of the magnitude of the closing force of the closing spring.

The non-return valve has an axial fluid passage permitting adjustment of the opening pressure optimal for operation of the assembly, so that no replacement of the valve for adaptation is necessary. The non-return valve may be configured for desired pressure adjustment ranges by appropriate design of the closing spring. Consequently, the non-return valve has an adjustment range extending over the anticipated ranges of opening pressure desired that may be selected for installation in a suitable assembly.

In especially advantageous exemplary embodiments of the present invention, a displacement device, which may be actuated from the exterior of the valve housing, is provided for control of the axial adjustment positions of the seat element. It accordingly permits adjustment of the opening pressure of the valve when installed under the prevailing operating conditions, without the need for installation operations.

In exemplary embodiments of the present invention distinguished by an especially simple and compact design, the interior wall of the valve housing restricting passage forms the guide for the displaceable seat element. The seat element is in the form of an adjustment piston having a coaxial interior passage. The edge of the passage faces the detent element, and forms the valve seat for a detent element having one valve element.

In such exemplary embodiments, the displacement device, which may be actuated from the exterior of the valve housing to adjust the opening pressure, is configured so that the wall of the valve housing forming the guide of the adjustment piston has at least one slot opening extending in the axial direction. A control pin extends through this opening. The pin interior end is seated in a radial hole of the adjustment piston. Its exterior section projects outside the valve housing. The projecting outer section of the control pin operates in conjunction with a positioning mechanism designed in accordance with the requirements and areas of application. A manually operated positioning device may be provided in addition to the controllable linear drives, a device such as a positioning nut on the valve housing, for example.

With a configuration of such positioning device, two diametrically opposite slot openings are provided, preferably in the valve housing, for two diametrically opposite control pins of the displacement device. In this instance, the force of displacement for adjustment processes is introduced by the positioning nut to two diametrically opposite positions in the displaceable adjustment piston serving as seat element. The adjustment processes may then be carried out with precision and with no danger of canting.

Preferably, the displacement device has two positioning nuts between which the section of the control pins projecting outward is contained. Not only may the control pins and the adjustment piston be adjusted in both adjustment directions, but the adjustment may be secured by locking the positioning nuts in a simple and reliable manner.

In advantageous exemplary embodiments, the spring-loaded locking element, the valve element of which interacts with the valve seat on the adjustment piston, is guided axially displaceable on a guide element present in the passage of the valve housing. The length of the displacement path made available for the detent element by this guide is great enough so that an adequate displacement path is available as opening lift of the detent element in all the adjustment positions of the adjustment piston involved.

By preference, the displacement device, which may be operated from the exterior of the valve housing and controls the axial adjustment positions of the adjustment piston serving as seat element, is provided with a display device providing a position display and accordingly an indication of the adjusted opening pressure. In exemplary embodiments in which the displacement device has positioning nuts on the valve housing, provision may be made for a visible marking or scale along the exterior of the valve housing from which the location of the positioning nuts may be read.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIG. 1 is a side elevational view, on an approximately actual scale, in section of a non-return valve according to one exemplary embodiment of the present invention.

DETAILED DESCRIPTION OF THE INVENTION

A valve housing 1 made of hexagonal stock has on one end an interior screw-in threading or thread 3 defining an end section of a fluid passage 7 concentric with the longitudinal axis 5. Adjacent to the hexagonal section of the valve housing 1 containing the interior threading 3 is a section 9 cylindrical both on the exterior and the interior. The end section 11 of cylindrical section 9 receives a connection adapter 13. Connection adapter 13 is forced into end section 11 and forms a second fluid connection. An interior screw-in threading or thread 15 is provided corresponding to the screw-in interior threading 3 on the opposite end of the housing 1.

An adjustment piston 17, forming the seat element of the non-return valve, is mounted in the cylindrical housing section 9 between the adapter 13 and the interior threading 3 so as to be axially displaceable. The adjustment piston 17 is sealed off from or sealed to the cylinder wall of the valve housing 1 in both of its axial end areas by O-rings (not shown) seated in annular grooves 19, so that the fluid passage 7 is also sealed off from slot openings 21 extending through the wall of the valve housing 1. The slot openings 21 extend in the axial direction and define an axial displacement path for the control pins 23 extending diametrically opposite each other through the slot openings 21. Control pins 23 are seated in radial blind holes 25 of the adjustment piston 17. The pin outer ends project beyond the exterior wall of the valve housing 1. The sections of the control pins 23 projecting to the exterior are situated between two positioning nuts 27 screwed onto exterior threading positioned on the housing section 9.

The adjustment piston 17 is slightly stepped on its exterior and is configured geometrically such that the O-rings seated in the annular grooves 19 are not damaged when it is installed in the valve housing 1.

The adjustment piston 17 has a coaxial interior passage 29. The edge of the opening of passage 29 facing the screw-in interior threading 3 forms a valve seat 31 in the form of a conical surface. The conical surface interacts with a corresponding valve cone 33 on the detent element 35.

The detent element 35 is mounted to be axially displaceable on a guide element 37 having a guide pin 39 concentric with the longitudinal axis 5 and engaged in a concentric blind hole 41 in the detent element 35. On the end facing away from the guide pin 39, the guide element 37 has arms 43 extending radially. The radially exterior edges of arms 43 are provided with exterior threading by which the guide element 37 is anchored on or coupled to the interior threading 3 of the valve housing 1. A helical compression spring 45, generating the closing force by which the valve cone 33 of the detent element 35 is pressed against the valve seat 31 on the adjustment piston 17, is mounted between the arms 43 of the guide element 37 and the thickening of the detent element 35 forming the valve cone 33.

FIG. 1 illustrates the adjustment position of the adjustment piston 17 serving as seat element in the position corresponding to the lowest opening pressure. If axial displacement of the adjustment piston 17 upward (corresponding to the figure) is effected by rotation of the positioning nuts 27 via the control pins 23, the detent element 35 is moved along against the closing force of the compression spring 45. The spring tension and accordingly the closing force are then increased. The adjustment path of the adjustment piston 17 and accordingly the greatest possible opening pressure which may be set are defined by the axial length of the slot openings 21. It is essential for the length of the blind hole 41 into which the guide pin 39 of the guide element 37 is introduced to make an adequate guide length available, so that an adequate displacement path of the detent element 35 is still available for the opening stroke, even when the adjustment piston 17 is in the end position of the displacement path.

The non-return valve of the present invention offers an axial fluid passage. Since no rerouting or change of direction of the flow is required, no problems resulting from depositing of particles need be feared if fouled fluids are involved. The structural elements of the non-return valve may be made of stainless steel, so that the valve is also suitable for aggressive media. A position marking or scale may be mounted on the exterior of the valve housing 1 to provide a display of the position of the adjustment piston 17. The valve may be preset for desired opening pressure values if calibrated markings or scales are present.

While one embodiment has been chosen to illustrate the invention, it will be understood by those skilled in the art that various changes and modifications can be made therein without departing from the scope of the invention as defined in the appended claims.

What is claimed is:

1. A non-return valve, comprising:
   a valve housing defining an interior fluid passage extending along a longitudinal axis of said housing, and having a wall with a first guide slot opening extending in an axial direction of said valve housing;
   a seat element in said fluid passage defining a valve seat;
   a closing spring in said valve housing;
   a detent element biased by said closing spring and mounted for axial movement in said passage between a detent position adjoining said seat element and opening positions spaced from said valve seat against biasing of said closing spring, said closing spring biasing said detent element against said valve seat;
   a first control pin extending through and guidedly movable in said slot opening and having an interior end seated in a radial hole of said seat element and an exterior section projecting from an exterior of said valve housing; and
   a displacement member actuatable on said exterior of said valve housing and engaged with said control pin to fix said control pin and said seat element in axial adjustment positions to adjust magnitudes of closing forces of said closing spring.

2. A non-return valve according to claim 1 wherein said valve housing includes an interior wall delimiting said fluid passage and forming a guide for axial displacement of said seat element, said seat element comprising an adjustment piston having an interior passage coaxial to said fluid passage, said interior passage having an edge facing said detent element and forming said valve seat, said detent element having a valve cone.

3. A non-return valve according to claim 1 wherein said valve housing comprises an exterior thread adjacent said slot opening; and said displacement member comprises a first positioning nut engaging said exterior thread and said exterior section of said control pin to adjust axial positioning of said seat element.

4. A non-return valve according to claim 3 wherein said valve housing comprises a second slot opening diametrically opposite said first slot opening; and a second control pin extends from said seat element diametrically opposite said first control pin and through said second slot opening, and has an exterior section projecting from said exterior of said valve housing.

5. A non-return valve according to claim 4 wherein said displacement member comprises a second positioning nut engaging said exterior thread, said exterior sections of said control pins being positioned between said first and second positioning nuts.

6. A non-return valve according to claim 1 wherein a guide element with fluid passages is mounted in said fluid passages of said valve housing, said guide element being guided for axial displacement within said valve housing.

7. A non-return valve according to claim 6 wherein said guide element comprises a guide pin extending concentrically with said longitudinal axis and received in a blind bore hole in said detent element concentric with said longitudinal axis, said blind bore hole being open on an end of said detent element facing away from said seat element, said blind bore hole having an axial length permitting axial displacement of said detent element relative to said guide pin corresponding to said open positions.

8. A non-return valve according to claim 6 wherein said closing spring comprises a helical compression spring positioned between said guide element and said detent element.

9. A non-return valve according to claim 8 wherein guide element comprises a guide pin on an end thereof adjacent to and engaging said detent element and radially extending arms on an end thereof opposite said guide pin, said radially extending arms being anchored on said valve housing and supporting said closing spring.

10. A non-return valve according to claim 1 wherein said seat element comprises an adjustment piston with an interior passage coaxial with said fluid passage.

11. A non-return valve according to claim 10 wherein said interior passage has an edge facing said detent element and forming said valve seat.

12. A non-return valve according to claim 11 wherein said detent element comprises a valve cone.

* * * * *